(12) United States Patent
Chen

(10) Patent No.: US 11,320,676 B2
(45) Date of Patent: May 3, 2022

(54) HEAD-UP DISPLAY DEVICE AND DISPLAY METHOD THEREOF

(71) Applicant: BOE TECHNOLOGY GROUP CO., LTD., Beijing (CN)

(72) Inventor: Yanjun Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 377 days.

(21) Appl. No.: 16/469,270

(22) PCT Filed: Jan. 28, 2019

(86) PCT No.: PCT/CN2019/073436
§ 371 (c)(1),
(2) Date: Jun. 13, 2019

(87) PCT Pub. No.: WO2020/001021
PCT Pub. Date: Jan. 2, 2020

(65) Prior Publication Data
US 2021/0325700 A1    Oct. 21, 2021

(30) Foreign Application Priority Data
Jun. 29, 2018 (CN) .......................... 201810696269.6

(51) Int. Cl.
*G02F 1/01* (2006.01)
*B60K 35/00* (2006.01)
(Continued)

(52) U.S. Cl.
CPC ............ *G02F 1/0136* (2013.01); *B60K 35/00* (2013.01); *G02F 1/13362* (2013.01); *G02F 1/13363* (2013.01); *B60K 2370/1529* (2019.05)

(58) Field of Classification Search
None
See application file for complete search history.

(56) References Cited

U.S. PATENT DOCUMENTS 4,925,272 A    5/1990  Ohshima et al.
5,140,465 A    8/1992  Yasui et al.
(Continued)

FOREIGN PATENT DOCUMENTS

CN    103764448 A    4/2014
CN    104865702 A    8/2015
(Continued)

OTHER PUBLICATIONS

First Chinese Office Action dated Nov. 1, 2019, received for corresponding Chinese Application No. 201810696269.6, 17 pages.
(Continued)

*Primary Examiner* — Ashok Patel
(74) *Attorney, Agent, or Firm* — Kinney & Lange, P.A.

(57) ABSTRACT

A head-up display device and a display method thereof are provided. the head-up display device includes: an image source configured to generate and emit light having image information; a first polarization control device configured to receive the light and convert the light into a first polarized light or a second polarized light having a polarization direction different from a polarization direction of the first polarized light; and a focal length switching device configured to transmit the first polarized light and the second polarized light and have different deflection effects on the first polarized light and the second polarized light, such that the first polarized light and the second polarized light passing through the focal length switching device are projected onto a projection screen to respectively present virtual images which are at different distances from the projection screen.

19 Claims, 6 Drawing Sheets

(51) Int. Cl.
*G02F 1/13357* (2006.01)
*G02F 1/13363* (2006.01)

(56) References Cited

U.S. PATENT DOCUMENTS

| | | | |
|---|---|---|---|
| 9,426,364 | B2 | 8/2016 | Hashimoto |
| 10,012,836 | B2 | 7/2018 | Kim et al. |
| 2014/0132707 | A1 | 5/2014 | Hashimoto |
| 2015/0234458 | A1 | 8/2015 | Hsieh et al. |
| 2016/0147062 | A1* | 5/2016 | Yamakawa ............ G09G 3/002 348/203 |
| 2017/0336628 | A1 | 11/2017 | Kim et al. |
| 2018/0035103 | A1 | 2/2018 | Sung et al. |
| 2018/0373262 | A1 | 12/2018 | Wu et al. |
| 2019/0204491 | A1 | 7/2019 | Hong |
| 2019/0235240 | A1 | 8/2019 | Nagano et al. |

FOREIGN PATENT DOCUMENTS

| | | |
|---|---|---|
| CN | 104932104 A | 9/2015 |
| CN | 107323375 A | 11/2017 |
| CN | 107422477 A | 12/2017 |
| CN | 108181708 A | 6/2018 |
| CN | 108873367 A | 11/2018 |
| WO | 2017061019 A1 | 4/2017 |
| WO | 2018117012 A1 | 6/2018 |

OTHER PUBLICATIONS

International Search Report and English Translation of Box V of the Written Opinion dated Apr. 8, 2019, received for corresponding PCT Application No. PCT/CN2019/073436, 6 pages.
Dian-Ye Zhang, Dynamic Visual Field of Driver with Safety Driving, Jun. 2000, 8 pages, Journal of Southwest Jiaotong University, vol. 35 No. 3.
Graham J. Woodgate and Jonathan Harrold, LP-1: Late-News Poster: High Efficiency Reconfigurable 2D/3D Autostereoscopic Display, 2003, 4 pages, Ocuity Limited, U.K.
Joel Neilsen, Chapter 20: Driving Vision, 7 pages, Safe Drive Training, accessed from www.sdt.com.au, last updated Nov. 1, 2019.
http://www.wannadrive.com/article/effect-of-speed-on-vision-ID-205, accessed on Nov. 29, 2019.
Third Chinese Office Action dated Feb. 2, 2021, received for corresponding Chinese Application No. 201810696269.6, 16 apges.
Partial Supplementary European Search Report dated Mar. 2, 2022, for European Application No. 19825068.0.

* cited by examiner

HEAD-UP DISPLAY DEVICE AND DISPLAY METHOD THEREOF

CROSS-REFERENCE TO RELATED APPLICATION

This application is a Section 371 National Stage Application of International Application No. PCT/CN2019/073436, filed on Jan. 28, 2019, entitled "HEAD-UP DISPLAY DEVICE AND DISPLAY METHOD THEREOF", which claims the benefit of Chinese Patent Application No. 201810696269.6 filed on Jun. 29, 2018 in the State Intellectual Property Office of China, the whole disclosure of which is incorporated herein by reference.

TECHNICAL FIELD

The present disclosure relates to the field of display technologies, and in particular, to a head-up display device and a display method thereof.

BACKGROUND

At present, as a vehicle speed continues to increase, a driver's viewpoint focal length also increases correspondingly, resulting in a narrowed visual field of the driver. If a size and distance of a virtual image displayed by the head-up display are at a suitable position when the vehicle is driven at a low speed, as the vehicle speed increases, the driver's viewpoint focal length increases, and accordingly, a sight distance of the virtual image displayed needs to be adjusted, otherwise the driver's eye fatigue may be caused. As the driver's visual field becomes narrow, a proportion of the virtual image displayed will become larger, which may cause discomfort in viewing.

SUMMARY

Some embodiments of the present disclosure provide a head-up display device comprising: an image source configured to generate and emit light having image information; a first polarization control device configured to receive the light and convert the light into a first polarized light or a second polarized light having a polarization direction different from a polarization direction of the first polarized light; and a focal length switching device configured to transmit the first polarized light and the second polarized light and have different deflection effects on the first polarized light and the second polarized light, such that the first polarized light and the second polarized light passing through the focal length switching device are projected onto a projection screen to respectively present virtual images which are at different distances from the projection screen.

In some embodiments, the head-up display device further comprising: a speed monitoring device configured to detect a traveling speed of a carrier where the head-up display device is mounted and transmit a speed information; and a system control device configured to control the image source to generate the image information desired, receive the speed information, and control the first polarization control device to convert the light into the first polarized light or the second polarized light based on the speed information.

In some embodiments, the focal length switching device comprises a birefringence focal length switching element comprising a first layer and a second layer, wherein the first layer faces the first polarization control device and comprises a birefringent material having a first refractive index for the first polarized light and a second refractive index, which is different from the first refractive index, for the second polarized light, wherein the second layer is disposed on a side of the first layer away from the first polarization control device, and the second layer has a third refractive index for both the first polarized light and the second polarized light, the third refractive index is the same as one of the first refractive index and the second refractive index.

In some embodiments, the birefringent material comprises liquid crystals whose long axes are arranged in a fixed direction.

In some embodiments, the first layer is equivalent to a lens having a finite focal length, and the lens having the finite focal length comprises one of a convex lens, a binary optical element, a super lens and a quadratic phase plate.

In some embodiments, the birefringence focal length switching element is in a flat-plate shape.

In some embodiments, the first refractive index is n1, the second refractive index is n2, and the third refractive index is n1, n2<n1.

In some embodiments, the system control device is configured to control the first polarization control device to convert the light into the first polarized light in response to the travelling speed being greater than a threshold, such that the first polarized light passes through the birefringence focal length switching element to present a first virtual image on the projection screen, the first virtual image being apart from the projection screen by a first distance; and control the first polarization control device to convert the light into the second polarized light in response to the travelling speed being less than or equal to the threshold, such that the second polarized light passes through the birefringence focal length switching element to present a second virtual image on the projection screen, the second virtual image being apart from the projection screen by a second distance, wherein the first distance is greater than the second distance, and a size of the first virtual image is smaller than a size of the second virtual image.

In some embodiments, a size of a light-emitting region of the image source for presenting the first virtual image meets a formula $$OE' = O \times SE' \times \frac{1}{S} \times \frac{i_L}{i_H},$$

wherein, OE' is the size of the light-emitting region of the image source for presenting the first virtual image, O is a size of a light-emitting region of the image source for presenting the second virtual image, $i_L$ is the second distance, $i_H$ is the first distance, SE' is the size of the first virtual image, and S is the size of the second virtual image.

In some embodiments, the first polarized light is S light and the second polarized light is P light.

In some embodiments, the head-up display device further comprising a second polarization control device, wherein the second polarization control device is disposed on a light exit side of the focal length switching device.

In some embodiments, the head-up display device further comprising a mirror group between the focal length switching device and the projection screen.

In some embodiments, the mirror group comprises two mirrors both designed with a freeform surface.

In some embodiments, the head-up display device further comprising a transparent cover plate between the focal length switching device and the projection screen.

In some embodiments, the focal length switching device comprises a birefringent prism that causes the first polarized light and the second polarized light to travel along different optical paths, wherein the focal length switching device further comprises a mirror having a first reflective portion having a first focal power and a second reflective portion having a second focal power, wherein the first polarized light is reflected by the first reflective portion to present a first virtual image on the projection screen, and the first virtual image is apart from the projection screen by a first distance, wherein the second polarized light is reflected by the second reflective portion to present a second virtual image on the projection screen, and the second virtual image is apart from the projection screen by a second distance; wherein the first distance is greater than the second distance, and a size of the first virtual image is smaller than a size of the second virtual image.

In some embodiments, the head-up display device further comprising: a speed monitoring device configured to detect a traveling speed of a carrier where the head-up display device is mounted and transmit a speed information; and a system control device configured to control the image source to generate the image information desired, receive the speed information, and control the first polarization control device to convert the light into the first polarized light or the second polarized light based on the speed information.

In some embodiments, the birefringent prism comprises a Nicol prism or a Wollaston prism.

In some embodiments, the image information comprises a first image information and a second image information, and the head-up display device further comprises: a system control device configured to control the image source to alternately generate the first image information and the second image information, wherein the system control device controls the first polarization control device to convert the light into the first polarized light in response to a case that the image source generates the first image information; wherein the system control device controls the first polarization control device to convert the light into the second polarized light in response to a case that the image source generates the second image information.

Some embodiments of the present disclosure provide a display method of a head-up display device, comprising: detecting a traveling speed of a carrier where the head-up display device is mounted; controlling a first polarization control device to switch a polarization mode in response to a speed range within which the traveling speed is, such that a light having image information and generated by an image source is converted into a first polarized light or a second polarized light having a polarization direction different from a polarization direction of the first polarized light, and projecting the first polarized light and the second polarized light passing through a focal length switching device onto a projection screen to respectively present virtual images which are at different distances from the projection screen, based on different deflection effects of the focal length switching device on the first polarization light and the second polarization light.

In some embodiments, the display method further comprising: controlling the first polarization control device convert the light into the first polarized light in response to the travelling speed being greater than a threshold, such that the first polarized light passes through the focal length switching device to present a first virtual image on the projection screen, the first virtual image being apart from the projection screen by a first distance; controlling the first polarization control device to convert the light into the second polarized light in response to the traveling speed being less than or equal to the threshold, such that the second polarized light passes through the focal length switching device to present a second virtual image on the projection screen, the second virtual image being apart from the projection screen by a second distance, wherein the first distance is greater than the second distance, and a size of the first virtual image is smaller than a size of the second virtual image.

DETAILED DESCRIPTION OF EMBODIMENTS

In order to make the objects, technical solutions and advantages of the present disclosure more comprehensible, the present disclosure will be further described in detail below with reference to the specific embodiments and the accompanying drawings.

It should be noted that all the expressions using "first" and "second" in the embodiments of the present disclosure are used to distinguish two entities with the same name that are not the same or two non-identical parameters. It can be seen that "first" and "second" are merely for convenience of description, and should not be construed as limiting the embodiments of the present disclosure. The subsequent embodiments will not explain this again.

Figure 1A:
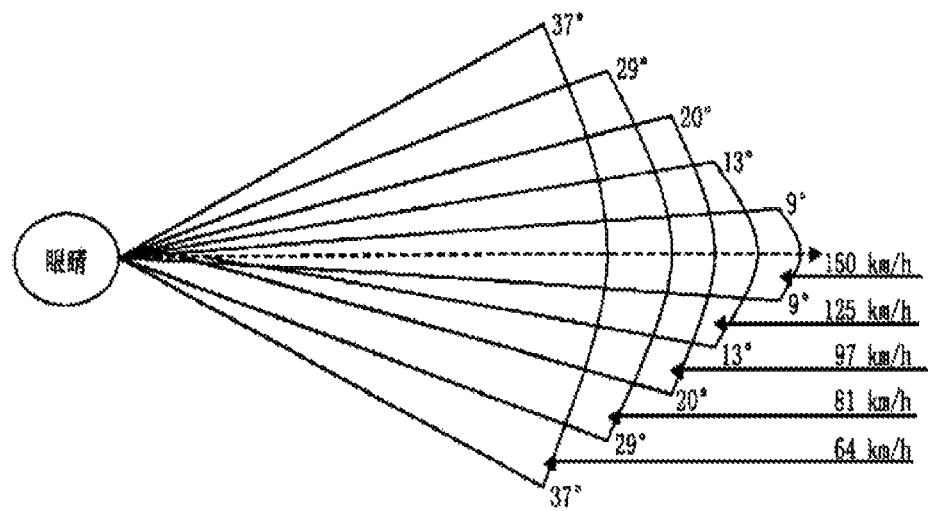
FIG. 1a is a schematic view of a viewpoint focal length and a visual field of a driver which change with a vehicle speed in the related art.
Figure 1B:
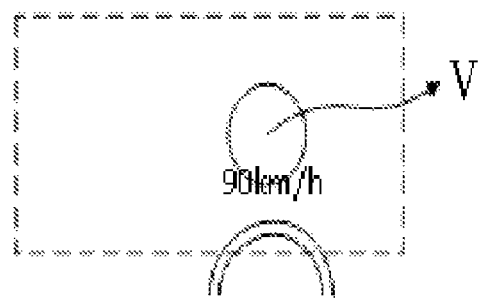
FIG. 1b is a schematic view of a visual field of a driver at a high speed in the related art.
Figure 1C:
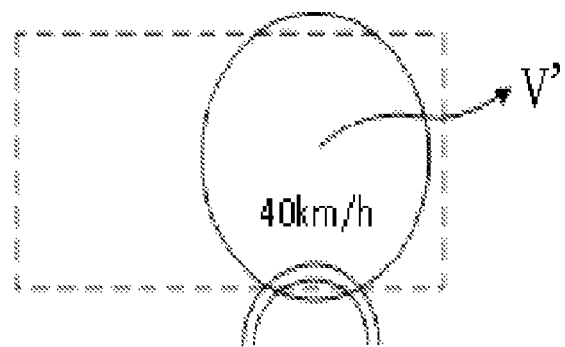
FIG. 1c is a schematic view of a visual field of a driver at a low speed in the related art.

FIG. 1a shows a schematic view of a viewpoint focal length and a visual field of a driver which change with a vehicle speed. As can be seen from FIG. 1a, as the vehicle speed increases, the viewpoint focal length perceived by the driver will continue to be raised, and visual field will continue to be narrowed. FIG. 1b and FIG. 1c are schematic views of a visual field of a driver at a high speed and a low speed, respectively. It can be seen by a comparison of the two figures that the visual field V of the driver at the high speed (e.g., 90 km/h) is significantly less than the visual field V' of the driver at the low speed (e.g., 40 km/h). In such a condition, if a size of a projection image produced by a conventional head-up display device remains unchanged, it will bring discomfort to the driver's viewing, and the driver may also suffer eye fatigue due to a change of a sight distance, which is not conducive to driving.

Figure 2:
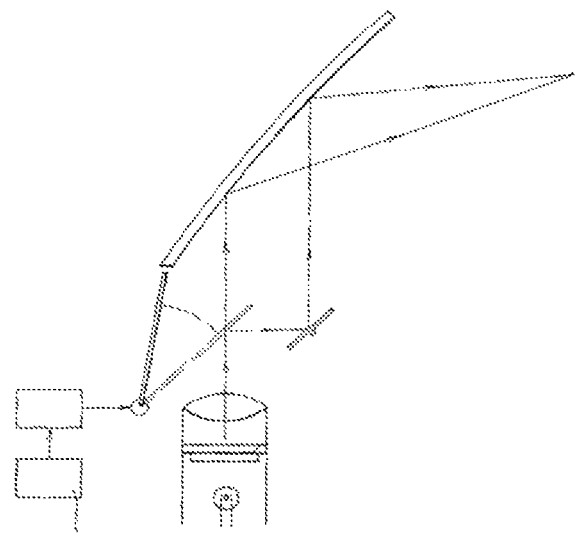
FIG. 2 is a schematic view of a mechanical switching control structure in the related art.
Figure 3:
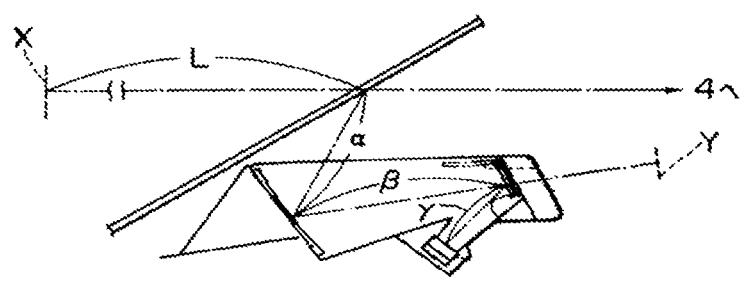
FIG. 3 is a schematic view of another mechanical switching control structure in the related art.

In view of this, the solution of the related art is to adjust a distance and a size of an auxiliary display image by a mechanical control. For example, as shown in FIG. 2, a vehicle head-up display device is provided, which proposes to control a mechanical rotating device and a shifting device to deflect an optical path, such that an imaging distance of a virtual image is switched according to a vehicle speed. Referring to FIG. 3, a head-up display device in which a reflective device is movable into and/or out of an optical path is provided, light is emitted from an image source onto a first plane mirror, and a size and a distance of a virtual image is controlled by superimposing or removing a concave mirror on the first plane mirror, thereby realizing to switch an imaging distance of the virtual image according to a vehicle speed. When a driving device drives the concave mirror to be placed into the optical path, the virtual image is enlarged, and is imaged on a far imaging plane; when the concave mirror is removed out of the optical path, the virtual image is not enlarged, and is imaged on a near imaging plane.

Both of the above solutions can achieve the switching of the imaging distance of the virtual image, however each of the two solutions adopt mechanical rotation or movement so that a system structure is complex, and a response time is long. The control stability of such mechanical rotation and driving equipment is low. In addition, at high speed, the imaging distance of the virtual image formed by the image source is increased, and the size of the virtual image is also enlarged at the same time, which is contrary to the need for virtual image reduction due to the narrowing of the driver's visual field with the increasing vehicle speed. It may also cause the driver to be uncomfortable while watching. The mechanical focal length control switching manners in the related art are difficult for the driver to obtain an accurate and effective visual field adjustment, which affects the display effect.

Thus, the present disclosure provides a head-up display device and a corresponding display method for the problems in the related art described above, so that at least one of the above problems in the related art can be alleviated or overcome.

Figure 4:
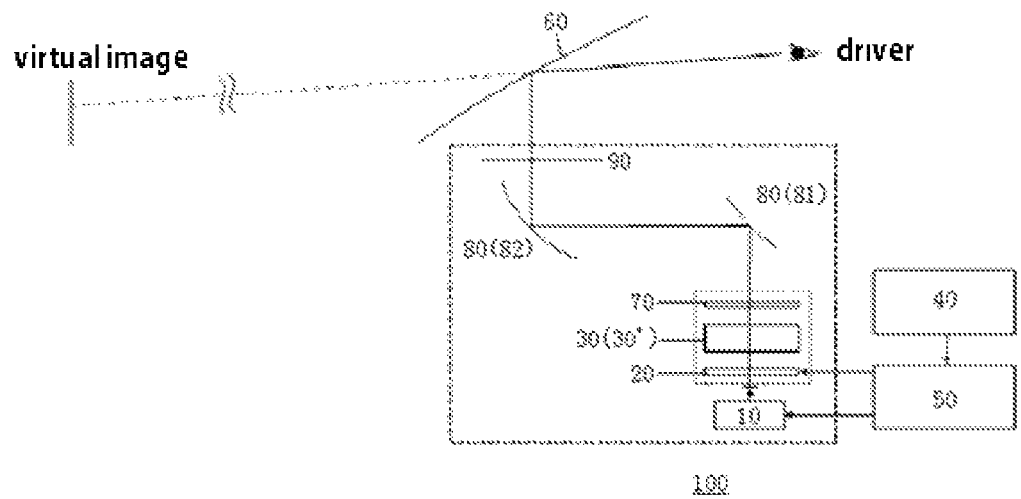
FIG. 4 is a schematic structural view of a head-up display device according to some embodiments of the present disclosure.

FIG. 4 is a schematic structural view of a head-up display device according to some embodiments of the present disclosure. As can be seen from FIG. 4, a head-up display device 100 provided by some embodiments of the present disclosure includes an image source 10, a first polarization control device 20, and a focal length switching device 30.

Image source 10 is configured to generate and emit light having image information. The first polarization control device 20 is configured to receive the light and convert the light into a first polarized light, such as S light or a second polarized light having a different polarization direction from the first polarized light, such as P light.

The focal length switching device 30 has different deflection effects on the first polarized light and the second polarized light, such that the first polarized light and the second polarized light passing through the focal length switching device are projected onto a projection screen to respectively present virtual images which are different in distance from the projection screen.

As shown in FIG. 4, the head-up display device 100 provided by some embodiments of the present disclosure further includes a speed monitoring device 40 and a system control device 50.

The speed monitoring device 40 is configured to detect a traveling speed of a carrier (e.g., vehicle) carrying the head-up display device 100, and transmit a detected speed information to the system control device 50. The vehicle may be any type of vehicles, such as a car, a bus, a subway, or the like, and the speed monitoring device 40, such as a speed sensors, may be separately provided or integrated in a vehicle body, and the embodiments of the present disclosure is not limited thereto. In addition, the application scenario of the embodiments of the present disclosure can also be extended to other vehicles such as airplanes, trains, and the like.

The system control device 50 is configured to control the first polarization control device 20 to output light with different polarization directions according to the speed information and control the image source 10 to output light having corresponding image information. The system control device 50 may control the image source 10 and the first polarization control device 20 by using any existing kinds of control chips or control equipments, and the embodiments of the present disclosure do not limit the specific setting manners the parameters of control, and the like.

The image source 10 emits light having image information that is desired to be displayed according to the control of the system control device 50; wherein the image information that is desired to be displayed may include the vehicle speed, the travel distance, and the like, and may also include environment information such as pedestrian warning, vehicle warning, and lane line warning. The embodiments of the present disclosure do not limit the specific contents of the image information as long as it can assist the driver in driving.

The first polarization control device 20 is configured to convert the light having image information desired to be displayed into polarized light of different polarization directions according to the control of the system control device 50, and emit the polarized light into the focal length switching device. In the embodiments, for convenience of description, the polarized light of different polarization directions may be denoted by a first polarized light and a second polarized light, respectively, for example, the first polarized light may be S light, and the second polarized light may be P light. Optionally, the first polarization control device 20 is capable of outputting polarized light, typically such as S light or P light, of different polarization directions under the control of the system control device 50. In some embodiments, other devices may also be included to output other polarized light of different polarizations, for example, more than two types of polarized light, which are not limited by the embodiments of the present disclosure.

For example, the first polarization control device 20 may include a polarizer and a controllable optical rotator. The polarizer is configured to convert natural light, for example, light including image information into polarized light, and the polarizer is, for example, a polarizing sheet, a polarizing plate, or the like. The controllable optical rotator is configured to adjust the polarization direction of the polarized light, and the controllable optical rotator is, for example, a liquid crystal panel.

The focal length switching device 30 is configured to receive the polarized light emitted by the first polarization control device 20 and project it out, wherein the focal length switching device 30 can make the polarized light with different polarization directions propagate along different optical paths or be deflected in different extent, thereby enabling switching of different optical paths.

The light having the image information is emitted from the image source 10, sequentially passes through the first polarization control device 20 and the focal length switching device 30, and finally is projected onto a projection screen 60 for auxiliary display. Optionally, the projection screen 60 may be a front windshield or a separate auxiliary display glass, which is not limited in the embodiments of the present disclosure.

Figure 5:
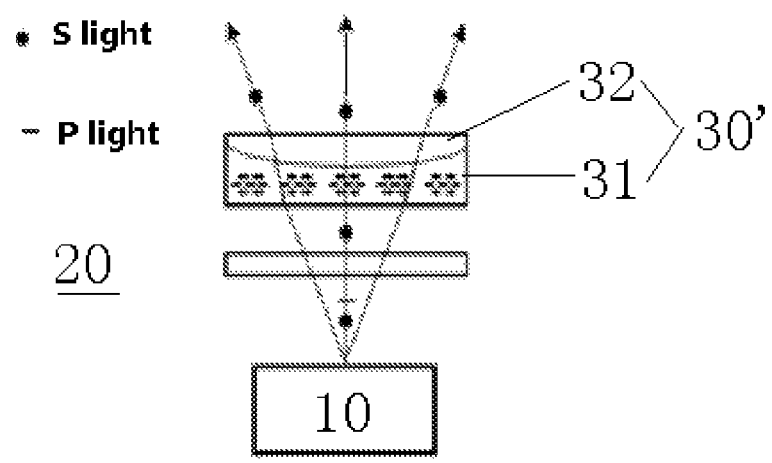
FIG. 5 is a schematic view of an optical path of a first polarized light passing through a birefringence focal length switching element.

In some optional embodiments, the focal length switching device 30 is a birefringence focal length switching element 30'. FIG. 5 is a schematic view of an optical path of a first polarized light passing through a birefringence focal length switching element; and FIG. 6 is a schematic view of an optical path of a second polarized light via a birefringence focal length switching element.

Figure 6:
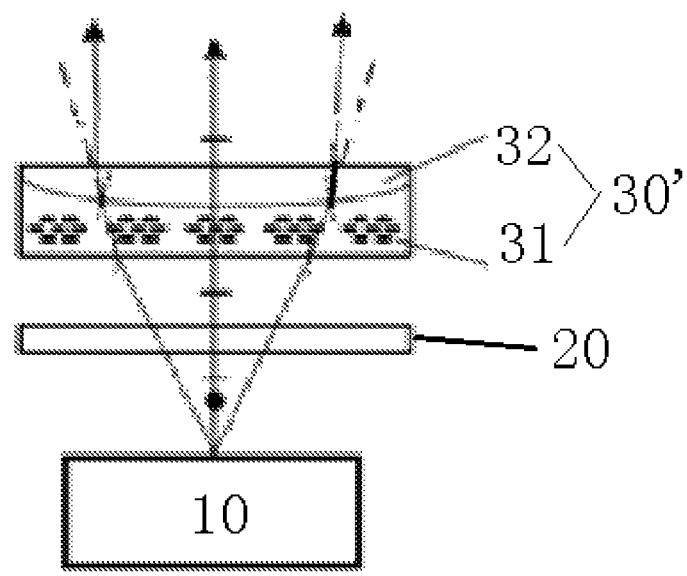
FIG. 6 is a schematic view of an optical path of a second polarized light passing through a birefringence focal length switching element.

Referring to FIG. 5 and FIG. 6, the birefringence focal length switching element 30' may include a first layer 31 and a second layer 32, wherein the first layer 31 faces the first polarization control device 20 and includes a birefringent material. The birefringent material includes liquid crystals arranged in an aligned manner, that is, long axes of the liquid crystal molecules in the liquid crystal are arranged in a fixed direction. The birefringent material has a first refractive index n1 for the first polarized light, such as S light, and a second refractive index n2 different from the first refractive index n1 for the second polarized light, such as P light. The second layer 32 is disposed on a side of the first layer 31 away from the first polarization control device 20. The second layer 32 has a third refractive index n3 for both the first polarized light and the second polarized light, and the third refractive index is the same as one of the first refractive index n1 and the second refractive index n2. For example, the third refractive index n3 is the same as the first refractive index n1, that is, n3=n1. As shown in FIG. 5 and FIG. 6, the first layer 31 is equivalent to a lens having a finite focal length, and a focal length of a lens having a finite focal length is finite. The lens may include one of a convex lens, a binary optical element, a super lens and a quadratic phase plate. Optionally, the birefringence focal length switching element 30' may be in a shape of flat plate.

Specifically, referring to FIG. 5, it may be a control state in a case where the vehicle is traveling at a high speed. At this time, the system control device 40 controls the output light of the first polarization control device 20 to be the first polarized light, for example, S light. In this case, the polarization direction of the S light is perpendicular to the long axes of the birefringent material (for example, liquid crystal) molecules in the birefringence focal length switching element, the refractive indexes of the first layer 31 and the second layer 32 for the S light are the same, both of them are n1, so there is no phase step at an interface between the first layer 31 and the second layer 32, and the birefringence focal length switching element 30' is equivalent to a flat glass. An angle of diffusion of the light emitted from the birefringence focal length switching element 30' does not change, so that the virtual image is imaged at a remote position, which may match an increased sight distance of the driver at the high speed state.

Referring to FIG. 6, it may be a control state in a case where the vehicle is traveling at a low speed. At this time, the system control device 40 controls the output light of the first polarization control device 20 to be the second polarized light, for example, P light. At this time, the polarization direction of the P light is parallel to the long axes of the birefringent material (for example, liquid crystal) molecules in the birefringence focal length switching element, and the refractive index n2 of the first layer 31 for the P light is different from the refractive index n1 of the second layer 32 for the P light, and n2<n1. The birefringence focal length switching element 30' converges the P light, so that the virtual image is imaged at a close position, which may match a decreased sight distance of the driver at the low speed state. Therefore, the imaging distance of the display image can be matched with the sight distance of the driver at different vehicle speeds by the above-described adjustment control, which greatly improves the comfort of the driver's while viewing the display image.

Meanwhile, since the imaging position changes due to different optical paths, it is also necessary to adjust a light-emitting region of the image source 10. Specifically, the system control device 40 controls the light-emitting region of the image source 10 according to the visual field of the driver in the high speed and/or low speed states while controlling the polarization state of the light to perform focal length switching. That is, the number of pixels of the image source 10 for displaying the image is adjusted, thereby ensuring that the virtual image is suitable for the visual field of the driver.

Figure 7:
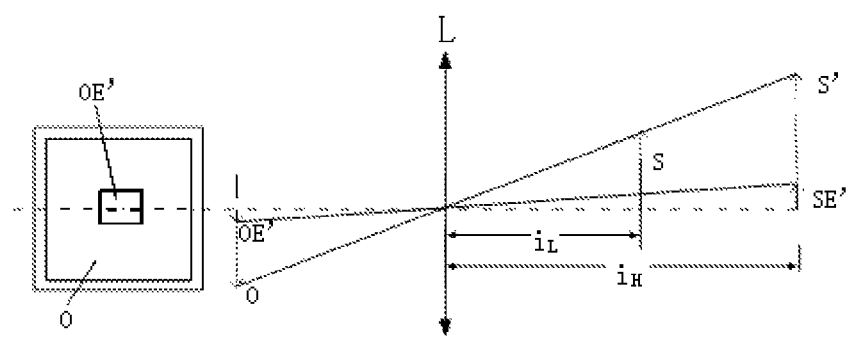
FIG. 7 is a schematic view of a control principle of a light-emitting region of an image source according to some embodiments of the present disclosure.

FIG. 7 is a schematic view of a control principle of a light-emitting region of an image source provided by some embodiments of the present disclosure. As shown in FIG. 7, the birefringence focal length switching element 30' is equivalent to a lens L. When the carrier, such as vehicle, where the head-up display device is mounted is traveling at a low speed, for example, when the traveling speed is less than or equal to a threshold value, the second polarized light, such as the P light, presents a second virtual image on the projection screen, such as the front windshield. In this case, the size of the light-emitting region of the image source 10 is O, the imaging distance is $i_L$, and the imaging size of the second virtual image is S. When the carrier, such as vehicle, where the head-up display device is mounted is traveling at a high speed, for example, when the traveling speed is greater than the threshold value, the first polarized light, such as the S light, presents a first virtual image on the projection screen, such as the front windshield. In this case, the size of the light-emitting region of the image source 10 is reduced to OE', the imaging distance is switched to $i_H$, and the imaging size is reduced to SE' due to narrowing of the visual field, that is, the imaging size of the first virtual image is SE'. According to FIG. 7, the ratio of the size/pixel of the light-emitting region of an image source in the high speed state to that in the low speed state can be derived. The ratio can be obtained by the following formula:

$$\frac{S'}{S} = \frac{i_H}{i_L}, \frac{OE'}{O} = \frac{SE'}{S'}$$

where S' is a size of a virtual image which is presented by the first polarized light, such as the S light, on the projection screen, such as the front windshield, when the size of the light-emitting region of the image source 10 is assumed to be O.

Therefore, it is possible to derive the size OE' of the light-emitting region of the image source 10 which is suitable for the high speed state, $$OE' = O \times SE' \times \frac{1}{S} \times \frac{i_L}{i_H}.$$

In addition, since the polarization principle utilized in the above embodiments may cause loss of the optical path, the brightness of the image source may be further adjusted to compensate the loss so that a sufficiently clear display image may be obtained for the driver.

In some embodiments, the focal length switching device 30 may include a plurality of stacked birefringence focal length switching elements, and an optical rotator is disposed between adjacent birefringence focal length switching elements. In this way, the switching control for more optical path states can be realized by multi-layer control, which may adapt to more different speed ranges. For example, the focal length switching device includes a first birefringence focal length switching element and a second birefringence focal length switching element stacked on each other, and a controllable optical rotator is disposed between the first birefringence focal length switching element and the second birefringence focal length switching element and configured to change the polarization direction of polarized light. In this case, the focal length switching device may realize four kinds of focal length switching, respectively:

In a first kind, the first polarization control device emits S light, the S light passes through the first birefringence focal length switching element (which is equivalent to a flat glass), the controllable optical rotator does not change the polarization direction of the S light, and the S light passes through the second birefringence focal length switching element (which is equivalent to a flat glass) for projection;

In a second kind, the first polarization control device emits S light, the S light passes through the first birefringence focal length switching element (which is equivalent to a flat glass), and the controllable optical rotator converts the S light into P light, and the P light passes through the second birefringence focal length switching element (which is equivalent to a converging lens) for projection;

In a third kind, the first polarization control device emits P light, the P light passes through the first birefringence focal length switching element (which is equivalent to a converging lens), the controllable rotator does not change the polarization direction of the P light, and the P light passes through the second birefringence focal length switching element (which is equivalent to a converging lens) for projection;

In a fourth kind, the first polarization control device emits P light, the P light passes through the first birefringence focal length switching element (which is equivalent to a converging lens), and the controllable optical rotator converts the P light into S light, and the S light passes through the second birefringence focal length switching element (which is equivalent to a flat glass) for projection.

In some optional embodiments of the present disclosure, as shown in FIG. 4, the head-up display device 100 further includes a second polarization control device 70, such as a controllable optical rotator, and the second polarization control device 70 is disposed on a light exit side of the focal length switching device 30 and configured to adjust the light intensity of the displayed image. The light after passing through the first polarization control device 20 and the focal length switching device 30, such as the birefringence focal length switching element, may be P light or S light. The light is incident onto the windshield at a certain angle and reflected to the human eye. According to the Brewster reflection principle, when the light is incident at the Brewster angle, the reflected light intensity of the P light is attenuated to 0. Therefore, in this case, it is necessary to adjust the P light to the S light by the second polarization control device 70 to prevent the light intensity of the light reflected to the human eye from being affected.

In some optional embodiments of the present disclosure, the head-up display device 100 further includes a mirror group 80 which is disposed between the focal length switching device 30 and the projection screen 60 (e.g., the front windshield) and configured to adjust the optical path. When the environment inside the vehicle is relatively fixed, it may be difficult for the head-up display device 100 in the foregoing embodiments to guide the optical path to the position to be displayed, in such a condition, a mirror group is required to achieve adjustment of the optical path. For example, as shown in FIG. 4, the mirror group 80 includes two mirrors, a first mirror 81 and a second mirror 82. Optionally, both mirrors 81, 82 are designed with a freeform surface so as to correct distortion and aberration introduced in the light path.

In some optional embodiments of the present disclosure, the head-up display device 100 may further include a transparent cover 90. As shown in FIG. 4, a transparent cover 90 is disposed between the focal length switching device 30 and the projection screen 60, and is configured to prevent dust and to block external interference light.

Figure 8:
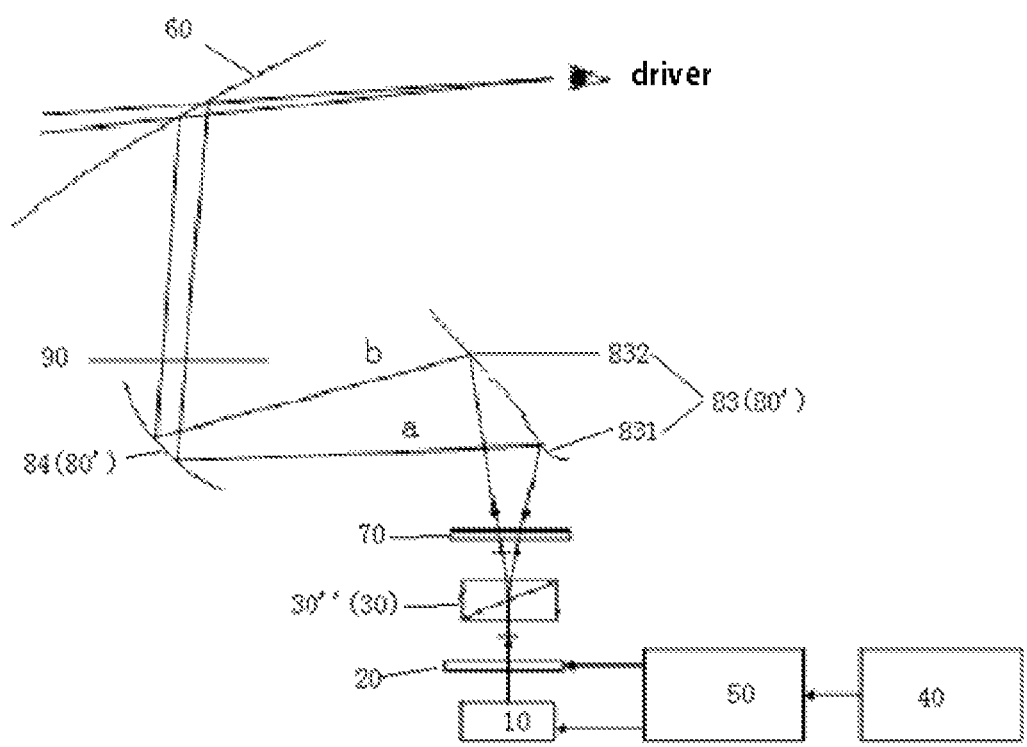
FIG. 8 is a schematic structural view of a head-up display device according to other embodiments of the present disclosure.

FIG. 8 is a schematic structural view of a head-up display device according to other embodiments of the present disclosure. In the embodiments, the basic structure is substantially the same as that in the foregoing embodiments, the difference lies in that the focal length switching device 30 includes a birefringent prism. For example, the birefringent prism is a Nicol prism or a Wollaston prism. In this way, polarized light having different polarization directions, such as S light and P light, are refracted in different directions by using the polarization characteristics of the birefringent prism, and accordingly, an optical path may be adjusted by using the mirror group to finally realize the display of different optical paths on the windshield. In the embodiments, a mirror group 80' includes a third mirror 83 and a fourth mirror 84, and the third mirror 83 includes a first reflective portion 831 having a first focal power and a second reflective portion 832 having a second focal power, the first focal power of the first reflective portion 831 is less than the second focal power of the second reflective portion 832. In the embodiments, the first reflective portion 831 having the first focal power may be a convex reflective portion having a negative focal power, and the second reflective portion 832 having the second focal power may be a planar reflective portion having a focal power equal to zero. Specifically, referring to FIG. 8, when the carrier, such as vehicle, where the head-up display device is mounted is travelling at a high speed, the first polarization control device 20 outputs S light. The S light pass through the birefringent prism 30" and travels in a first optical path a, then the S light is reflected by the first reflective portion 831 and the fourth mirror 84, and projected onto the projection screen 60 to form a first virtual image which is remote from the projection screen 60. When the carrier, such as vehicle, where the head-up display device is mounted is travelling at a low speed, the first polarization control device 20 outputs P light. The P light pass through the birefringent prism 30" and travels in a second optical path b, then the P light is reflected by the second reflective portion 832 and the fourth mirror 84, and projected onto the projection screen 60 to form a second virtual image which is close to the projection screen 60. In this way, process complexity and processing costs can be reduced by using a simple birefringent prism. In the embodiments, under the joint action of the birefringent prism and the third mirror, virtual images which are apart from the projection screen by different distance are presented by the light of different polarization directions. The birefringent prism and the third mirror together constitute the focal length switching device in the embodiments.

It should be noted that, in the embodiments, the S light and the P light travel in different optical paths, so the first virtual image and the second virtual image may be presented at different regions of the projection screen 60, such as the front windshield. In the foregoing embodiments, the S light and the P light travel along substantially one same optical path, the only difference is whether the convergence occurs. Therefore, the first virtual image and the second virtual image in the foregoing embodiment may be substantially presented in the same region of the projection screen 60.

It should be noted that, since the optical paths in the embodiments is different from that in the foregoing embodiments, it is necessary to adaptively adjust the structure and position of the mirror group.

Figure 9:
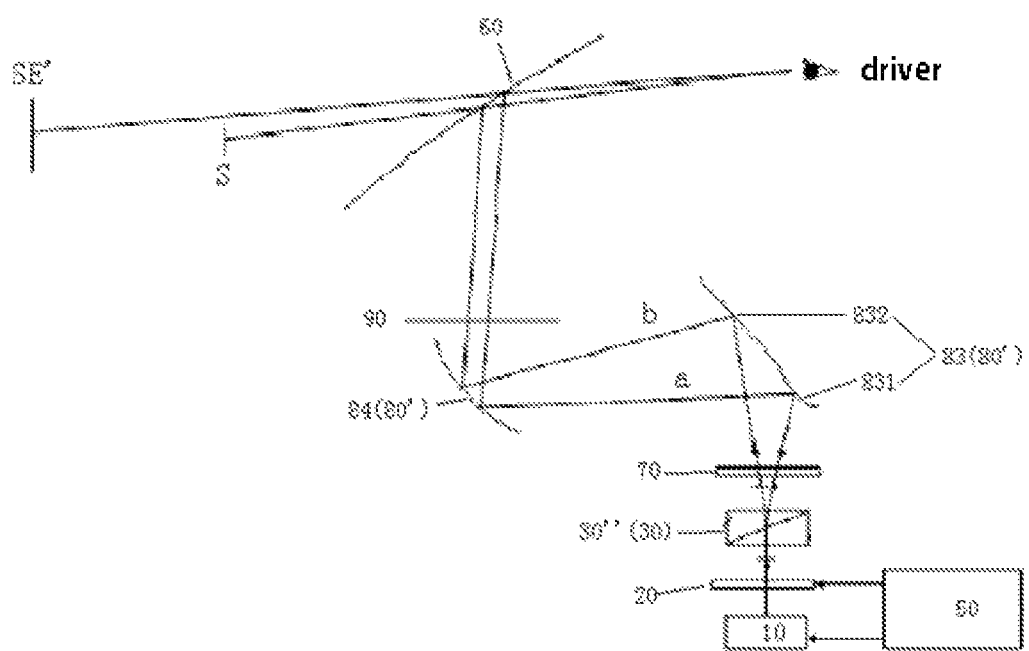
FIG. 9 is a schematic structural view of a head-up display device according to still other embodiments of the present disclosure.

FIG. 9 is a schematic structural view of a head-up display device according to still other embodiments of the present disclosure. As shown in FIG. 9, the head-up display device provided in the embodiments is similar in term of structure to the head-up display device shown in FIG. 8, and the focal length switching device 30 also includes a birefringent prism. The S light outputted by the first polarization control device 20 passes through the birefringent prism 30" and travels in the first optical path a, the S light is reflected the first reflective portion 831 having a focal power and the fourth mirror 84, and projected on the projection screen 60 to form a first virtual image which is remote from the projection screen 60. The P light outputted by the first polarization control device 20 passes through the birefringent prism 30" and travels in the second optical path b, then the P light is reflected by planar reflective portion 832 without focal power and the fourth mirror 84, and projected on the projection screen 60 to form a second virtual image which is close to the projection screen 60. The difference between the head-up display device provided in the embodiments and the head-up display device shown in FIG. 8 lies in that, in the embodiments, there is no speed monitoring device, the system control device 50 directly controls the image source 10 and the first polarization control device 20 to achieve the projection display. Double-layer display is realized by using two virtual images presented by the above two optical paths in combination with time division multiplexing, and the double-layer display includes, for example, augmented reality display and status information display. That is, double-layer head-up display is realized by using a combination of time division multiplexing and polarization control. Specifically, when the system control device 50 controls the first polarization control device 20 to output a first polarized light, such as S light, the S light travels in the first optical path a to present a first virtual image which is a far layer display image and may display status information, such as speed, mileage, etc. When the system control device 50 controls the first polarization control element 20 to output a second polarized light, such as P light, the P light travels in the second optical path b to present a second virtual image which is a near layer display image and may display augmented reality information such as a driving route indication or the like.

Some embodiments of the present disclosure further provide a display method of a head-up display device, including the following steps:

detecting a traveling speed of a carrier where the head-up display device is mounted;

controlling a first polarization control device to switch a polarization mode in response to a speed range within which the traveling speed is, such that a light, having image information, generated by an image source is converted into a first polarized light or a second polarized light having a different polarization direction from the first polarized light, and projecting the first polarized light and the second polarized light projected passing through a focal length switching device onto a projection screen to respectively present virtual images which are different in distance from the projection screen, based on different deflection effects of the focal length switching device on the first polarization light and the second polarization light.

Specifically, in response to the travelling speed being less than or equal to a threshold, the system control device controls the first polarization control device to convert the light into P light, and the P light passes through the focal length switching device to present a second virtual image on the projection screen, the second virtual image being apart from the projection screen by a second distance;

In response to the travelling speed being greater than the threshold, the system control device controls the first polarization control device to convert the light into S light, and the S light passes through the focal length switching device to present a first virtual image on the projection screen, the first virtual image being apart from the projection screen by a first distance which is greater than the second distance.

In some embodiments, for example, the carrier equipped with the head-up display device is a vehicle, and the display method of the head-up device includes:

Detecting a current vehicle speed and determining a speed range in which the current vehicle speed is located;

According to the vehicle speed range within which the current vehicle speed is, the first polarization control device is controlled to switch the polarization mode by the system control device, so that the polarized light output by the first polarization control device and the display region of the image source are both matched with the of sight distance of the driver corresponding to the vehicle speed range. Different vehicle speed ranges respectively correspond to different control manners for the first polarization control device and the image source, and the driver may has a good display feeling as long as the control is carried out according to the corresponding relationship.

For example, the vehicle speed range is set to a high speed mode and a low speed mode, and a threshold, such as a vehicle speed threshold, is set between the high speed mode and the low speed mode.

If the current vehicle speed is less than or equal to the preset vehicle speed threshold, the first polarization control device is controlled to switch into the low speed mode by the system control device, so that the first polarization control device outputs P light, and the control image source is switched into a low speed display region. The low speed display region is an image display region that matches a size of visual field when the vehicle travels at a low speed, that is, a light-emitting region of the image source when the second virtual image is presented.

If the current vehicle speed is greater than the preset vehicle speed threshold, the first polarization control device is controlled to switch into the high speed mode by the system control device, so that the first polarization control device outputs S light, and the control image source is switched to a high speed display region. The high speed display region is an image display region that matches a size of visual field when the vehicle travels at a high speed, that is, the light-emitting region of the image source when the first virtual image is presented. A size of the high speed display region is smaller than a size of the low speed display region. Referring to FIG. 7, since the imaging distance is relatively short at the low speed, the driver may have a good display feeling by using the low speed display region which is relatively large. While at a high speed, since the imaging distance is relatively long, magnification of the projection may increase, if the low speed display region is maintained, the driver's view will be completely filled by the displayed image, thereby causing interference. Therefore, it is necessary to reduce the display region, so that the driver may have the same comfortable display feeling after a larger magnification. It should be noted that the low speed display region and the high speed display region are relatively speaking, and the embodiment does not limit the setting of the specific region.

The above judgment process is continuously performed at preset time intervals until the auxiliary display is turned off.

The above method has the same effect as the device, which will not be described again here.

It should be understood by those skilled in the art that the discussion of any of the above embodiments is only exemplary, and is not intended to imply that the scope of the disclosure (including the claims) is limited to these examples. In the idea of the present disclosure, the technical features in the above embodiments or different embodiments may also be combined, and the steps can be carried out in any order. Further, there are many other variations of the various aspects of the present disclosure as described above, which are not provided in detail for the sake of brevity.

In addition, in the case that the specific details (e.g., circuitry) are set forth to describe exemplary embodiments of the present disclosure, it is apparent to those skilled in the art that the present disclosure may be implemented without these specific details or with the specific details being changed. Therefore, these descriptions should be considered as illustrative rather than restrictive.

Although the present disclosure has been described in connection with the specific embodiments of the present disclosure, many alternatives, modifications and variations of these embodiments will be apparent to those skilled in the art.

The embodiments of the present disclosure are intended to cover all such alternatives, modifications, and variations included within the scope of the appended claims. Therefore, any omissions, modifications, equivalents, improvements, etc. that are made within the spirit and scope of the present disclosure are intended to be included within the scope of the present disclosure.

What is claimed is:

1. A head-up display device comprising:
   an image source configured to generate and emit light having image information;
   a first polarization control device configured to receive the light and convert the light into a first polarized light or a second polarized light having a polarization direction different from a polarization direction of the first polarized light;
   a focal length switching device configured to transmit the first polarized light and the second polarized light and have different deflection effects on the first polarized light and the second polarized light, such that the first polarized light and the second polarized light passing through the focal length switching device are projected onto a projection screen located on an optical path of each of the first polarized light and the second polarized light, to respectively present virtual images which are at different distances from the projection screen;
   a speed monitoring device configured to detect a traveling speed of a carrier where the head-up display device is mounted and transmit a speed information; and
   a system control device configured to control the image source to generate the image information desired, receive the speed information, and control the first polarization control device to convert the light into the first polarized light or the second polarized light based on the speed information.

2. The head-up display device of claim 1, wherein the first polarized light is S light and the second polarized light is P light.

3. The head-up display device of claim 1, wherein the focal length switching device comprises a birefringence focal length switching element comprising a first layer and a second layer,
   wherein the first layer faces the first polarization control device and comprises a birefringent material having a first refractive index for the first polarized light and a second refractive index, which is different from the first refractive index, for the second polarized light,
   wherein the second layer is disposed on a side of the first layer away from the first polarization control device, and the second layer has a third refractive index for both the first polarized light and the second polarized light, the third refractive index being the same as one of the first refractive index and the second refractive index.

4. The head-up display device of claim 3, wherein the birefringent material comprises liquid crystals whose long axes are arranged in a fixed direction.

5. The head-up display device of claim 3, wherein the first layer is equivalent to a lens having a finite focal length, and the lens having the finite focal length comprises one of a convex lens, a binary optical element, a super lens and a quadratic phase plate.

6. The head-up display device of claim 5, wherein the birefringence focal length switching element is in a flat-plate shape.

7. The head-up display device of claim 5, wherein the first refractive index is n1, the second refractive index is n2, and the third refractive index is n1, n2<n1.

8. The head-up display device of claim 7, wherein the system control device is configured to
   control the first polarization control device to convert the light into the first polarized light in response to the travelling speed being greater than a threshold, such that the first polarized light passes through the birefringence focal length switching element to present a first virtual image on the projection screen, the first virtual image being apart from the projection screen by a first distance; and
   control the first polarization control device to convert the light into the second polarized light in response to the travelling speed being less than or equal to the threshold, such that the second polarized light passes through the birefringence focal length switching element to present a second virtual image on the projection screen, the second virtual image being apart from the projection screen by a second distance,
   wherein the first distance is greater than the second distance, and a size of the first virtual image is smaller than a size of the second virtual image.

9. The head-up display device of claim 8, wherein a size of a light-emitting region of the image source for presenting the first virtual image meets a formula $$OE' = O \times SE' \times \frac{1}{S} \times \frac{i_L}{i_H},$$

wherein, OE' is the size of the light-emitting region of the image source for presenting the first virtual image, O is a size of a light-emitting region of the image source for presenting the second virtual image, $i_L$ is the first second distance, $i_H$ is the first distance, SE' is the size of the first virtual image, and S is the size of the second virtual image.

10. The head-up display device of claim 1, further comprising a second polarization control device,
wherein the second polarization control device is disposed on a light exit side of the focal length switching device.

11. The head-up display device of claim 1, further comprising a mirror group between the focal length switching device and the projection screen.

12. The head-up display device of claim 11, wherein the mirror group comprises two mirrors both designed with a freeform surface.

13. The head-up display device of claim 1, further comprising a transparent cover plate between the focal length switching device and the projection screen.

14. The head-up display device of claim 1, wherein the focal length switching device comprises a birefringent prism that causes the first polarized light and the second polarized light to travel along different optical paths,
wherein the focal length switching device further comprises a mirror having a first reflective portion having a first focal power and a second reflective portion having a second focal power,
wherein the first polarized light is reflected by the first reflective portion to present a first virtual image on the projection screen, and the first virtual image is apart from the projection screen by a first distance,
wherein the second polarized light is reflected by the second reflective portion to present a second virtual image on the projection screen, and the second virtual image is apart from the projection screen by a second distance;
wherein the first distance is greater than the second distance, and a size of the first virtual image is smaller than a size of the second virtual image.

15. The head-up display device of claim 14, further comprising:
a speed monitoring device configured to detect a traveling speed of a carrier where the head-up display device is mounted and transmit a speed information; and
a system control device configured to control the image source to generate the image information desired, receive the speed information, and control the first polarization control device to convert the light into the first polarized light or the second polarized light based on the speed information.

16. The head-up display device of claim 14, wherein the birefringent prism comprises a Nicol prism or a Wollaston prism.

17. The head-up display device of claim 14, wherein the image information comprises a first image information and a second image information, and the head-up display device further comprises:
a system control device configured to control the image source to alternately generate the first image information and the second image information,
wherein the system control device controls the first polarization control device to convert the light into the first polarized light in response to a case that the image source generates the first image information;
wherein the system control device controls the first polarization control device to convert the light into the second polarized light in response to a case that the image source generates the second image information.

18. A display method of a head-up display device, comprising:
detecting a traveling speed of a carrier where the head-up display device is mounted;
controlling a first polarization control device to switch a polarization mode in response to a speed range within which the traveling speed is, such that a light having image information and generated by an image source is converted into a first polarized light or a second polarized light having a polarization direction different from a polarization direction of the first polarized light, and
projecting the first polarized light and the second polarized light passing through a focal length switching device onto a projection screen located on an optical path of each of the first polarized light and the second polarized light, to respectively present virtual images which are at different distances from the projection screen, based on different deflection effects of the focal length switching device on the first polarization light and the second polarization light.

19. The display method of claim 18, further comprising:
controlling the first polarization control device convert the light into the first polarized light in response to the travelling speed being greater than a threshold, such that the first polarized light passes through the focal length switching device to present a first virtual image on the projection screen, the first virtual image being apart from the projection screen by a first distance;
controlling the first polarization control device to convert the light into the second polarized light in response to the traveling speed being less than or equal to the threshold, such that the second polarized light passes through the focal length switching device to present a second virtual image on the projection screen, the second virtual image being apart from the projection screen by a second distance,
wherein the first distance is greater than the second distance, and a size of the first virtual image is smaller than a size of the second virtual image.

* * * * *